Figure 1:
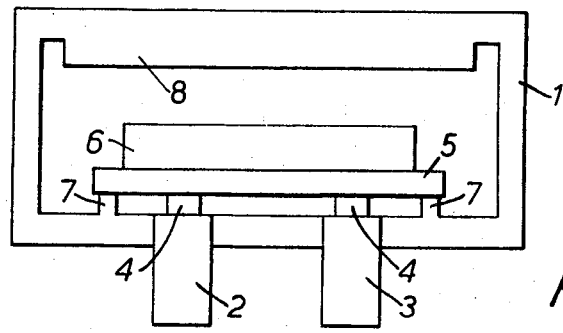

United States Patent
Senior

[15] 3,680,993
[45] Aug. 1, 1972

[54] MOULDING PRESS
[72] Inventor: David Clive Senior, Sheffield, England
[73] Assignee: Davy and United Engineering Company, Limited, Sheffield, England
[22] Filed: Oct. 13, 1969
[21] Appl. No.: 865,721

[30] Foreign Application Priority Data
Oct. 14, 1968 Great Britain............48,628/68

[52] U.S. Cl..................................425/167, 425/416
[51] Int. Cl. ............................................B28b 3/08
[58] Field of Search.........25/83, 84, 90, 91; 18/16 R, 18/17 P, 17 R, 16 P

[56] References Cited

UNITED STATES PATENTS

| | | | |
|---|---|---|---|
| 798,772 | 9/1905 | Fisher | 25/118 R |
| 2,313,623 | 3/1943 | Bungay | 18/16 R |
| 2,342,772 | 2/1944 | Wellman | 18/16 R |
| 3,089,189 | 5/1963 | Feldman et al. | 18/16 R X |
| 3,161,937 | 12/1964 | Gjertsen | 18/16 R X |
| 3,166,617 | 1/1965 | Munk | 18/16 R X |
| 3,261,897 | 7/1966 | Munk | 18/16 R X |
| 3,264,703 | 8/1966 | Gatti | 25/84 |
| 3,534,439 | 10/1970 | Haas et al. | 18/16 R |
| 3,050,778 | 8/1962 | Jurgeleit | 18/17 P |
| 3,353,216 | 11/1967 | Siempelkamp et al. | 18/17 P |
| 3,570,060 | 3/1971 | Stephenson | 18/16 P |

Primary Examiner—J. Spencer Overholser
Assistant Examiner—B. D. Tobor
Attorney—Holcombe, Wetherill & Brisebois

[57] ABSTRACT

A moulding press for moulding concrete panels has a fixed top plate and a movable platen beneath the top plate for supporting a mould containing material to be moulded. The platen consists of a plurality of separate parts arranged in side-by-side relation with each part having at least one hydraulic ram associated therewith for displacing the member towards and away from the top plate whereby material contained in the mould is displaceable into and out of pressing relation with the top plate.

7 Claims, 5 Drawing Figures

MOULDING PRESS

This invention relates to a moulding press particularly a press for moulding concrete panels.

According to the present invention a press for moulding panels includes a fixed top plate and a movable platen beneath the top plate for supporting a mould containing material to be moulded, said platen comprising a plurality of separate support members arranged in side-by-side relation with each member having at least one hydraulic ram associated therewith for displacing the member in the direction towards and away from the top plate whereby material contained in the mould is displaced into and out of pressing relation with the top plate.

The or each ram associated with each support member may be associated solely with that member or at least some of the rams may be associated with two adjacent support members. When moulding panels of substantially uniform thickness it is desirable that the displacement of the or each ram is controlled so that the members are displaced together and for the same extent so that the mould is raised evenly and the material in the mould is brought into contact with the top plate. If the mould on the platen does not extend to the opposite ends thereof the load on the end support members is less than that on the intermediate support members and if all the rams are displaced together and with the same force there is the possibility that the two end support members will be displaced relative to the intermediate members, thus damaging the moulded panel supported on the support members. It may be desirable therefore for the support members constituting the ends of the platen to each have at least one ram associated solely therewith and for each of the other support members to have at least one ram associated therewith which is also associated with the support member adjacent thereto. The rams associated solely with the end support members are controlled so as to take the reduced load on these members and not to displace these members relative to the intermediate members.

By providing the movable platen in the form of a plurality of support members the platen can readily be adjusted in one dimension by adding or taking away one or more members. This has the further advantage that the members can be transported to the site and erected individually thus avoiding difficulties of transportation and erection.

The top plate and the rams are supported by a rigid frame and preferably the frame is made up of a plurality of similar assemblies, the assemblies being arranged in side-by-side relation and with this construction the assemblies can be transported and erected individually.

Figure 2:
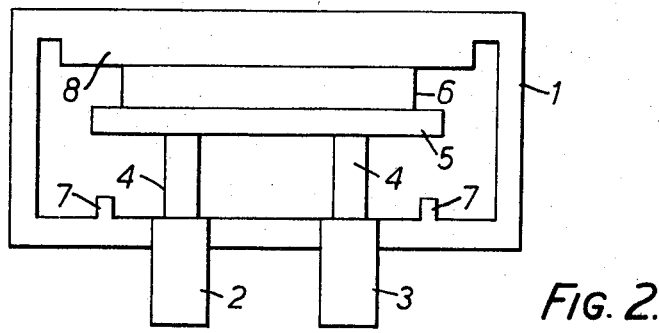
Figure 3:
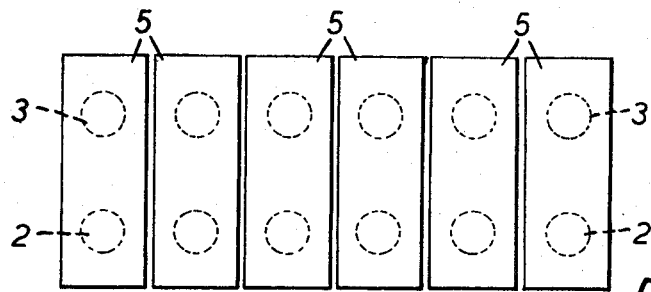
Figure 4:
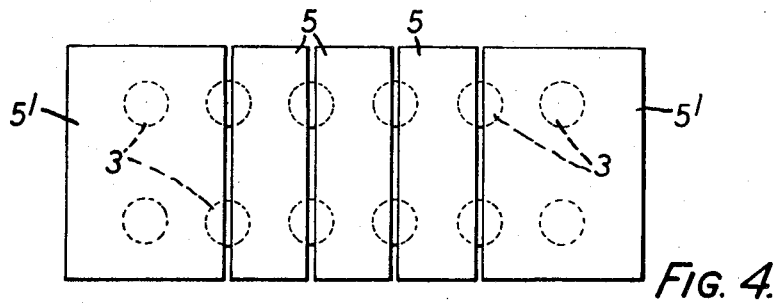
Figure 5:
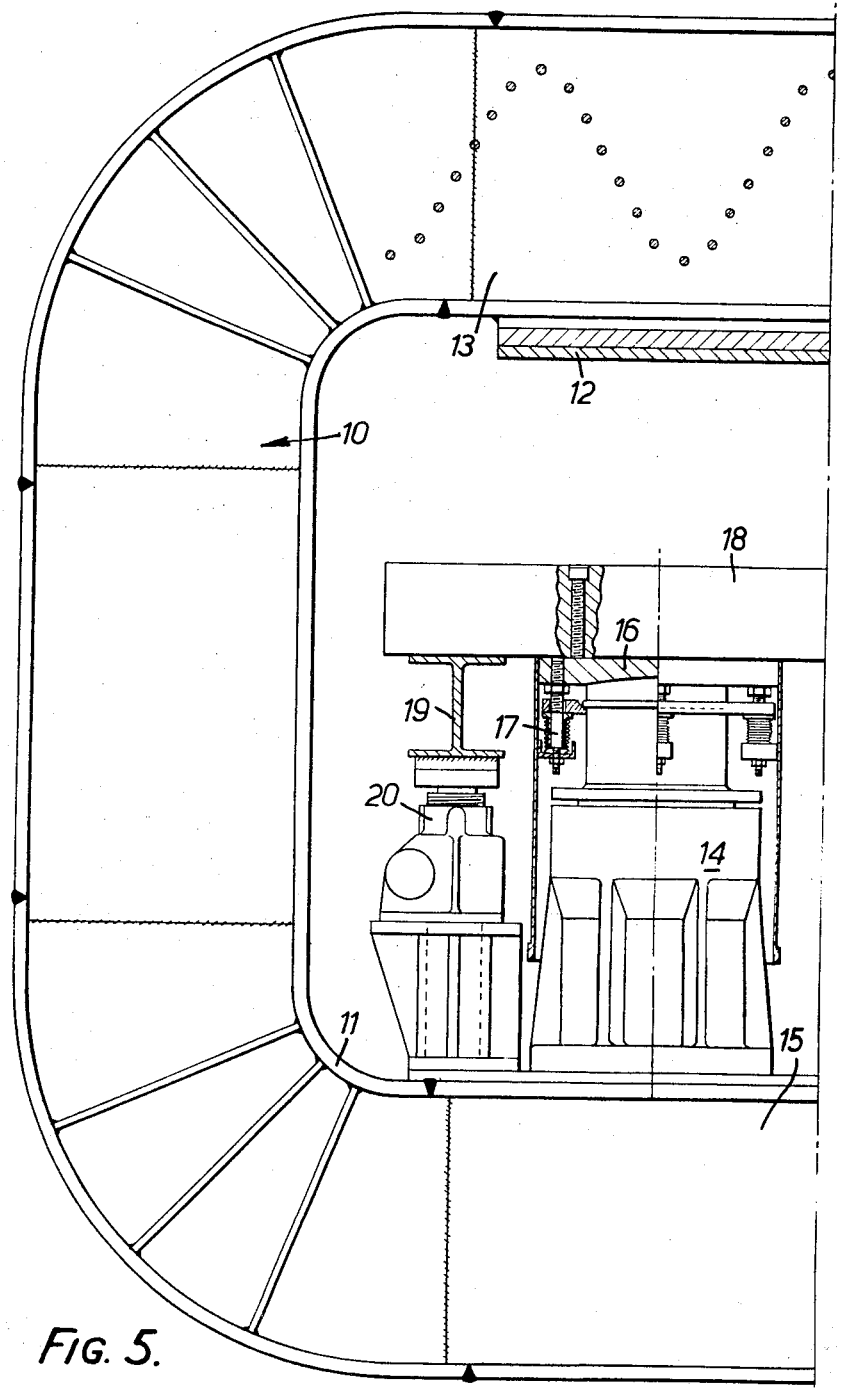

In order that the invention may be more readily understood it will now be described, by way of example only, with reference to the accompanying drawings, in which:

FIG. 1 is a diagrammatic side elevation of a press with the movable platen in the loading position, FIG. 2 is a diagrammatic side elevation of a press with the movable platen in the pressing position, FIG. 3 is a plan view of the movable platen, FIG. 4 is a plan view of an alternative construction of the movable platen, and FIG. 5 is a side elevation, partly in section, of part of a press for moulding concrete panels.

Referring to FIGS. 1 and 2, a press frame 1, of generally rectangular cross-section has a plurality of hydraulic rams secured to the bottom limb of the frame. The rams are arranged in pairs positioned one behind the other and one pair of rams 2 and 3 are shown. Each pair of rams have their pistons 4 abutting against the underside of a rigid member 5 extending substantially horizontally and disposed beneath the upper limb of the frame. Referring to FIG. 3, a plurality of the members 5 are shown arranged side-by-side with each member having a pair of the hydraulic rams associated therewith. The members 5 together constitute a movable platen for supporting a mould 6 on its upper surface. In FIG. 1 the rams 2 and 3 are de-energized and the members 5 are supported at their ends on stops 7 and the material in the mould is spaced from a top plate 8 supported on the underside of the top limb of the frame.

To mould a concrete panel, hydraulic fluid is applied to all of the rams so that the member associated with each pair of rams is displaced towards the top plate and in order that the members shall be displaced together and constitute a single platen, servo-control means (not shown) are employed to control the energization of the rams. The rams are energized until the support members have been raised sufficiently to displace the concrete in the mould into engagement with the top plate to press the material against the plate. This operating condition is shown in FIG. 2 and the concrete is compressed against the top frame for a sufficient interval of time to squeeze out the water from the concrete and cause it to be moulded to the shape defined by the mould. The mould has flexible side walls which permit the material contained in the mould to be compressed against the top plate.

With the arrangement shown in FIG. 3 there is the danger that the supports 5 constituting the ends of the platen may be displaced upwardly with respect to the other members if the load on these outer members is considerably less than the load on the other members. To avoid this difficulty a platen constructed as shown in FIG. 4 may be employed. To support members 5' constituting the ends of the platen each have a pair of rams 3 associated solely therewith and the further rams 3 engage with a pair of adjacent support members. With this arrangement the forces applied by the rams to the support members 5 tend to be equalized between the members 5 whereas the forces applied by the rams 3 which are solely associated with the end support members 5' need only be sufficient to raise and lower the support members 5' and the rams can be controlled so that the members 5' do not tend to be displaced relative to the support members 5.

Referring now to FIG. 5, the frame of a concrete moulding press is constituted by a number of similar ring units each of which has rounded corners 11 and which are arranged in side-by-side relationship; one such unit is shown at 10. Each unit has a horizontal top limb 13 and a horizontal lower limb 15 separated by vertical side limbs as shown. These limbs define an opening through the unit, the openings of the various units being aligned.

A rigid top plate 12 is supported on the underside of the top limb 13 of all the units 10. A pair of hydraulic rams, one of which is shown at 14, are carried on the upper surface of the lower limb 15 of each unit. A pair of hydraulic rams, one of which is shown at 14, are supported on the upper surface of the lower limb 15 of each unit. The upper end of the piston of each ram is resiliently urged into engagement with a plate 16 by means of spring loaded bolts 17. A rigid support member 18 extends substantially parallel to the upper and lower limbs of the frame of each unit and is bolted to the two plates 16 of that unit. The separate support members 18 constitute a movable lower platen of the press and serve to support a mould for containing the material to be pressed. Each member 18 extends outwardly beyond the hydraulic rams and its ends are supported on stops 19. The height of each stop relative to the bottom limb of the frame can be adjusted by means of a screw-jack 20.

A mould containing wet concrete is supported on the members 18 beneath the rigid plate 12 and by applying hydraulic fluid under pressure to each of the rams 14 the members 18 are raised together sufficiently to compress the concrete contained in the mould against the plate 12.

An advantage of dividing the frame into similar units arranged in side-by-side relation with each unit supporting one pair of hydraulic rams and with each pair of rams being associated with a separate support member is that the dimension of the maximum sized panel which can be accepted by the press can be varied by adding or taking away one or more units. A press frame comprising a plurality of units is disclosed and claimed in application Ser. No. 763,248, filed Sept. 27, 1968, by Trevor Hemingway, and commonly assigned.

What is claimed is:

1. A press for moulding panels comprising:
   a plurality of similar rigid ring frame units, each having top and bottom limbs separated by first and second side limbs and defining a central opening;
   all of said frame units being mounted parallel to each other in a single line with all said openings aligned to form a single tunnel;
   a single fixed top plate carried jointly by said top limbs of said units within said tunnel;
   a plurality of hydraulic rams mounted on the bottom limbs of the frame units within said tunnel directly beneath said top plate, each such unit supporting at least one ram;
   a plurality of separate support members mounted closely side-by-side within said tunnel and forming together a composite vertically movable platen between said rams and top plate, the longitudinal axes of said support members being perpendicular to the longitudinal axis of said tunnel and each support member being engaged by at least one ram;
   a mould carried jointly by a plurality of said support members for movement by said rams toward and away from said top plate; and
   control means for controlling the energization of said rams to raise said support members together at the same level.

2. A press as claimed in claim 1, in which each ram associated with each support member is associated solely with that member.

3. A press as claimed in claim 1, in which at least some of the rams are associated with two adjacent support members.

4. A press as claimed in claim 3 in which the support members consitituting the ends of the platen each have at least one ram associated solely therewith and each of the other support members has at least one ram associated therewith which is also associated with the support member adjacent thereto.

5. A press as claimed in claim 2 in which the piston of each ram is resiliently urged into engagement with a plate secured to the underside of the support member with which it is associated.

6. A press as claimed in claim 3 in which the piston of each ram associated with two adjacent support members is resiliently urged into engagement with a plate secured to the underside of each of the pair of adjacent members.

7. Press as claimed in claim 1 in which most of the area of the bottom of said mold is in direct contact with a support member.

* * * * *